March 5, 1963    A. A. AYKANIAN    3,079,636
BLOW EXTRUSION APPARATUS
Filed April 11, 1960    2 Sheets-Sheet 1
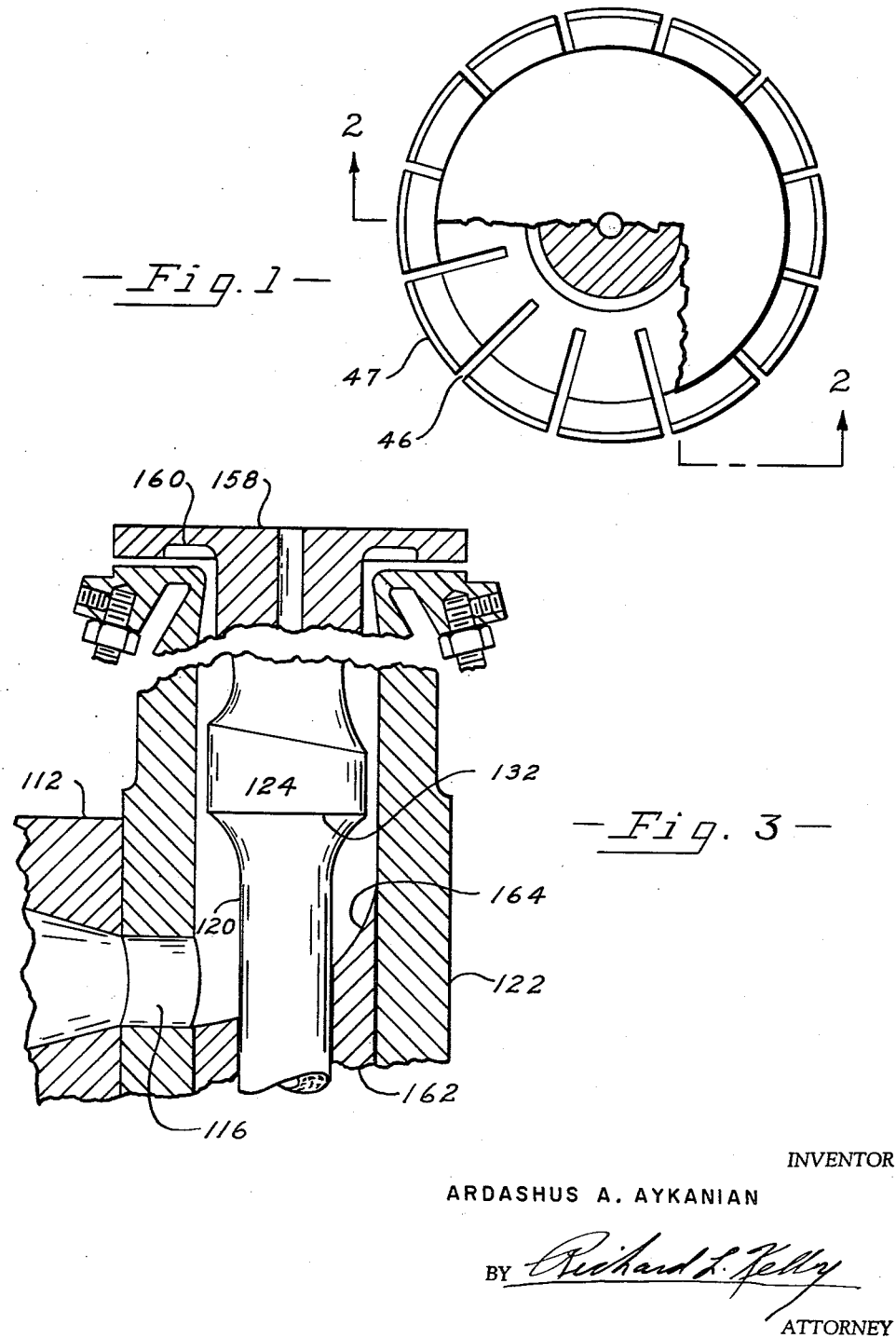
INVENTOR
ARDASHUS A. AYKANIAN
BY Richard L. Kelly
ATTORNEY

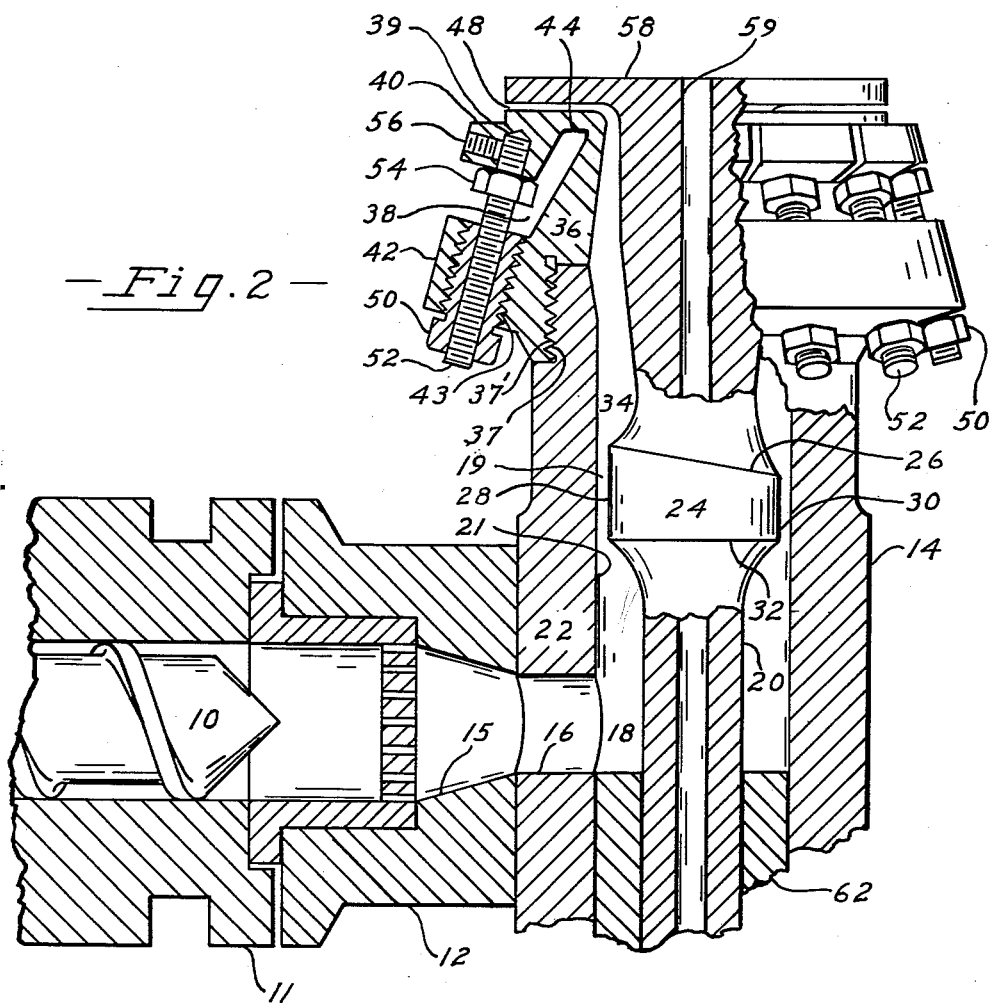

United States Patent Office 3,079,636
Patented Mar. 5, 1963

3,079,636
BLOW EXTRUSION APPARATUS
Ardashus A. Aykanian, Indian Orchard, Mass., assignor to Monsanto Chemical Company, St. Louis, Mo., a corporation of Delaware
Filed Apr. 11, 1960, Ser. No. 21,324
3 Claims. (Cl. 18—14)

This invention relates to an improved blow extrusion die and more specifically to a blow extrusion die which includes means for uniformly controlling the thickness of blown thermoplastic bodies.

In the blow extrusion of a tubular thermoplastic body, uniformity of thickness and density are generally desired by the industry. This has often been difficult to achieve particularly in systems where a cross-head extrusion die is employed. Some steps have been taken to compensate for these difficulties by employing dies having locally adjustable orifices. One obstacle encountered with such dies is that the extruding operation must be brought to a complete standstill in order to make such adjustments. Another obstacle is that relatively large adjustments are required to compensate for the differences in body thickness.

It is an object of this invention to provide a new and useful blow extrusion die.

Another object of this invention is to provide a new and useful blow extrusion die which includes means for locally changing the size of the orifice opening, which means can be adjusted without shutting down the extrusion operation.

Other objects and advantages of this invention will be apparent from the following detailed description thereof when read in conjunction with the attached drawings in which:

FIG. 1 is a top view of the die with certain parts broken away;

FIG. 2 is a vertical elevation of the die along the section line 2—2 in FIG. 1 with certain parts broken away; and FIG. 3 shows a modified embodiment of the die illustrated in FIGS. 1 and 2.

The blow extrusion die of this invention includes in combination, (a) a die block having an internal cylindrical bore, a transverse inlet port which communicates with the bore, and a yieldable flange integral with the die block and circumferential with the exit port of the bore, said flange being provided with a series of equispaced, thin transverse radial cuts, (b) a mandrel aligned axially within the cylindrical bore so as to define an annular passageway therebetween, and (c) a rigid die cap integral with the mandrel and having a substantially flat underside which is closely positioned to and substantially coextensive with the upper surface of the yieldable circumferential flange so as to define an annular orifice therebetween. Attached uniformly about the die block are a plurality of mechanical means associated with the yieldable flange and adapted to urge it towards or away from the die cap. Affixed permanently to and integral with the mandrel is a cylindrical projection axially aligned with the internal bore and tapered transversely to the axis of the mandrel, said projection having its maximum axial face at a point closest to the inlet port and its minimum axial face at a point farthest removed from the inlet port.

Illustrated in FIG. 2 is the blow extrusion die of this invention which is used in conjunction with a typical screw extruder. A stock feed screw 10 is mounted rotatably within a cylindrical stock feed housing 11 which is attached to the die adapter 12. Power driving means (not shown) are provided for positively rotating the stock screw 10. The die adapter 12 is attached to the blow extrusion die 14 so that the bore 15 of the die adapter communicates with inlet port 16 of the blow extrusion die 14.

The inlet port 16 communicates with the internal annular passageway defined by the cylindrical mandrel 20 and the cylindrical bore 21 of the die block, which for convenience of construction is made up of a die body 22 and a die head 36. Said annular passageway consists of three chambers, a lower annular chamber 18, a middle annular chamber 19 and an upper annular chamber 34. Fixedly positioned in the lower part of the internal bore of die body 22 is bushing ring 62, said bushing holding cylindrical mandrel 20 in fixed alignment with internal bore 21.

Chamber 19 is restricted by a cylindrical projection 24 on cylindrical mandrel 20, said projection being tapered in a plane transverse to the axis of mandrel 20 so that projection 24 has its greatest axial length defined by face 28 and its shortest axial length defined by face 30. Although the precise manner of tapering projection 24 is not critical, it is preferred to have the lower face 32 of projection 24 lie in a plane transverse to the axis of mandrel 20 and to have the upper face 26 of projection 24 lie in a plane inclined slightly from a plane transverse to the axis of mandrel 20.

The taper of projection 24 is defined by the ratio of the length of face 28 to the length of face 30. The taper of projection 24 to be employed will depend upon the material that is to be extruded through the die. When a foamable polystyrene is to be extruded at a temperature of 280–320° F., the ratio of the length of face 28 to the length of face 30 should be in the range of 1.40:1 to 2.00:1 and preferably is 1.69:1.

Die head 36 is attached to die body 22 by means of threads 37 and 37'. The die head is machined to provide a circular groove 38, an upper circular flange 40 and a lower circular flange 42. Groove 38 is machined to such a depth that upper flange 40 is attached to die head 36 by a relatively thin and yieldable web 44. A series of thin equispaced radial cuts 46—46 are machined in upper flange 40 to divide it into a series of bosses 47—47. Said radial cuts 46—46 extend completely through flange 40 and terminate at web 44.

Affixed to and integral with mandrel 20 is a circular rigid die cap 58 positioned transversally to and coaxially with mandrel 20. Die cap 58 spans the upper circular flange 40. Thus, the die cap 58 and the flange 40 define a die orifice 48.

Running axially through cylindrical mandrel 20 and die cap 58 is bore 59.

The lower circular flange 42 is provided with a series of concentric equispaced threaded taps 43—43. Each tap 43 is positioned below a boss 47 and an adjusting screw 50 is inserted therein. Mounted within each screw 50 is a second threaded adjusting screw 52 which passes through circular groove 38 and terminates in a smooth bore hole 39, machined in the lower face of boss 47. The adjusting screw 52 is locked in contact with the face of bore hole 39 by lock nut 54 and set screw 56. A clockwise or counter-clockwise turn of screw 50 will move screw 52 up or down, thus in turn moving yieldable boss 47 towards or away from die cap 58. To provide maximum sensitivity in controlling the opening of orifice 48, adjusting screw 50 has fewer threads per inch than adjusting screw 52.

A further embodiment of this invention is illustrated in FIG. 3. The underside of die cap 158 is machined to form an annular groove 160 having an arcuate cross sectional configuration, said groove being coaxial with the cylindrical mandrel 20 and with the inner periphery thereof being adjacent to said mandrel. Bushing ring 162, fixedly positioned in the internal bore of die body 122, has its top face 164 tapered in an upward direction from inlet port 116 to a position on the opposite side of the internal bore of die body 122 and terminating below the lower face of projection 124.

In both embodiments of this invention, during operation, the die receives a melted polymer, for example, foamable polystyrene, from extruder 10 through inlet port 16. The foamable polymer is distributed about mandrel 20 in the lower annular chamber 18 and is advanced through chamber 18 to annular chamber 19. Since the path of travel from inlet port 16 to various sections of chamber 19 differ in length, the foamable polymer advances through chamber 18 under uneven flow conditions. This is corrected by the tapered projection 24 which restricts chamber 19. Projection 24 so impedes the flow of the polymer that it enters upper annular chamber 34 at a uniform and equal flow rate around cylindrical mandrel 20. It is further advanced through chamber 34 to die orifice 48, through which it is extruded into a tubular thermoplastic sheet and delivered to pinch rolls. Air is blown through bore 59 for purposes of creating a bubble or envelope in the tubular sheet as it is extruded through die orifice 48.

In the second embodiment of this invention as shown in FIG. 3, tapered bushing ring 162 is used to insure streamline flow of the melted foamable polymer around mandrel 20 as it is advanced towards restricted chamber 19.

Annular groove 160 facilitates for faster expansion of the foamable polystyrene across the die orifice and thereby results in an extruded foamed polystyrene tubular sheet having reduced cell size and uniform cell structure.

In both embodiments, tubular sheet thickness is measured at periodic intervals, and changes in die orifice openings are made by adjusting each locally yieldable boss 47 where necessary in order to compensate for uneven thickness in the extruded tubular sheet.

It is to be understood that the above-identified structure and example of operation are simply illustrative of the application and principles of this invention and other arrangements which embody these principles may be readily devised by persons skilled in the art.

What is claimed is:
1. A blow extrusion die which comprises in combination:
   (a) a die block having an internal cylindrical bore running therethrough,
   (b) an inlet port in the die block which communicates with the cylindrical bore and is positioned transversely thereto,
   (c) a die head coaxially extending said cylindrical bore and in threaded engagement with the die block, said die head being provided with a circumferential yieldable web attached at its periphery to an upper circular flange, said flange consisting of a series of identical radial bosses whose sides are in immediate proximity to the sides of adjacent radial bosses, and a lower circular flange having a series of concentric equi-spaced threaded taps equal in number to the radial bosses of said upper flange, each of said taps being provided with an adjusting screw encompassing a second adjusting screw which in turn engages the underside of one of the radial bosses of said upper flange,
   (d) a cylindrical mandrel positioned within and in fixed spaced relationship with the cylindrical bore so as to define an annular passageway therebetween,
   (e) a cylindrical projection on the cylindrical mandrel which restricts the annular passageway, said projection being tapered transversely to the mandrel axis and having its maximum axial face at a point closest to the inlet port and its minimum axial face at a point farthest removed from the inlet port,
   (f) a rigid circular die cap integral with the mandrel, said die cap having a substantially flat underside which is closely positioned to and substantially coextensive with the upper surface of the circumferential flange so as to define an annular orifice therebetween, and
   (g) a bore extending through said mandrel and die cap.

2. A blow extrusion die as described in claim 1, wherein the adjusting screw which encompasses a second adjusting screw has fewer threads than said second adjusting screw.

3. A blow extrusion die as described in claim 1 in which:
   (a) the underside of the flat rigid circular die cap is undercut so as to define an annular groove coaxial with the cylindrical mandrel and the inner periphery of said groove being adjacent to said mandrel, and,
   (b) a bushing ring fixedly positioned in the passageway defined by the cylindrical bore and the mandrel, the top face of said bushing ring being tapered in an upward direction from a point immediately below the inlet port of the die block to a position on the opposite wall of the internal cylindrical bore, and terminating below the lower face of the cylindrical projection provided on the mandrel.

References Cited in the file of this patent
UNITED STATES PATENTS

| | | |
|---|---|---|
| 1,768,671 | Divine | July 1, 1930 |
| 2,057,467 | Williams | Oct. 13, 1936 |
| 2,560,778 | Richardson et al. | July 17, 1951 |
| 2,766,480 | Henning | Oct. 16, 1956 |
| 2,952,872 | Buteux et al. | Sept. 20, 1960 |
| 2,963,740 | Yim | Dec. 13, 1960 |
| 2,963,741 | Longstreth et al. | Dec. 13, 1960 |